US008714890B2

(12) United States Patent
Davancens et al.

(10) Patent No.: US 8,714,890 B2
(45) Date of Patent: May 6, 2014

(54) CUTTER FOR DRILLING AND REAMING

(75) Inventors: Angelica Davancens, Reseda, CA (US);
Eric Whinnem, Whittier, CA (US)

(73) Assignee: The Boeing Company, Chicago, IL (US)

( * ) Notice: Subject to any disclaimer, the term of this patent is extended or adjusted under 35 U.S.C. 154(b) by 1714 days.

(21) Appl. No.: 11/673,424

(22) Filed: Feb. 9, 2007

(65) Prior Publication Data
US 2008/0193234 A1  Aug. 14, 2008

(51) Int. Cl.
*B23B 35/00*   (2006.01)
*B23C 5/10*    (2006.01)

(52) U.S. Cl.
USPC ............ 409/132; 408/1 R; 408/224; 408/230; 407/54; 407/118; 407/61

(58) Field of Classification Search
USPC ......... 408/1 R, 223–225, 227, 230, 144–145; 409/131–132, 200; 407/53–55, 61, 407/118–119; 451/48
IPC ............................... B23C 5/00,5/02, 5/10, 5/18
See application file for complete search history.

(56) References Cited

U.S. PATENT DOCUMENTS

| 805,170 | A | * | 11/1905 | Thomas | 408/56 |
|---|---|---|---|---|---|
| 1,000,067 | A | * | 8/1911 | Bennett | 408/224 |
| 1,418,485 | A | * | 6/1922 | Smith | 408/224 |
| 1,503,000 | A | * | 7/1924 | Muller | 407/63 |
| 1,747,713 | A | * | 2/1930 | Havlista | 407/42 |
| 2,048,058 | A | * | 7/1936 | Comeau | 144/240 |
| 2,389,909 | A | * | 11/1945 | Hofbauer | 408/224 |
| 2,400,856 | A | * | 5/1946 | Thompson | 408/233 |
| 2,786,373 | A | * | 3/1957 | Patton | 408/59 |
| 2,915,949 | A | * | 12/1959 | Novkov | 409/200 |
| 3,977,807 | A | * | 8/1976 | Siddall | 408/223 |
| 4,411,563 | A | * | 10/1983 | Moon | 407/54 |
| 4,620,822 | A | * | 11/1986 | Haque et al. | 408/224 |
| 4,944,640 | A | * | 7/1990 | Suzuki et al. | 408/211 |
| 5,022,798 | A | * | 6/1991 | Eckman | 408/1 R |
| 5,071,294 | A | * | 12/1991 | Suzuki et al. | 408/145 |
| 5,112,167 | A | * | 5/1992 | Shiga et al. | 408/211 |

(Continued)

FOREIGN PATENT DOCUMENTS

| DE | 19903276 A1 | * | 8/2000 |
|---|---|---|---|
| DE | 10360344 A1 | * | 7/2005 |
| EP | 1059136 A1 | * | 12/2000 |
| GB | 540073 A | * | 10/1941 |

(Continued)

OTHER PUBLICATIONS

ISCAR, Inc., "Cutting Tools—Metal Working Tools", Jan. 2007, available at <http://www.iscar.com/ProductUpdate/ProductUpdateSubDetails.asp?CountryID=1&ProductUpdateDetailID=482>.

*Primary Examiner* — Daniel Howell

(57) ABSTRACT

Embodiments of the disclosure provide a drill bit including a drill bit body having a central axis. A first cutting edge is disposed on the drill bit body at a first radial distance from the central axis as measured within a plane normal to the central axis. And a second cutting edge is disposed on the drill bit body at a second radial distance from the central axis as measured from within the plane. The first radial distance is less than the second radial distance.

19 Claims, 2 Drawing Sheets

(56) References Cited

U.S. PATENT DOCUMENTS

| | | | |
|---|---|---|---|
| 5,122,040 A * | 6/1992 | Fields | 418/55.2 |
| 5,934,847 A * | 8/1999 | Thelin | 409/132 |
| D438,550 S * | 3/2001 | Uhlig et al. | D15/139 |
| 6,514,018 B2 | 2/2003 | Martinez et al. | |
| 6,644,897 B2 | 11/2003 | Martinez et al. | |
| 6,773,211 B2 * | 8/2004 | Zackrisson et al. | 409/132 |
| 6,913,428 B2 * | 7/2005 | Kress et al. | 408/144 |
| 7,014,394 B2 | 3/2006 | Inglis | |
| 2002/0136612 A1 | 9/2002 | Martinez et al. | |
| 2003/0077132 A1 | 4/2003 | Martinez et al. | |
| 2007/0014645 A1 | 1/2007 | Amirehteshami et al. | |

FOREIGN PATENT DOCUMENTS

| | | | |
|---|---|---|---|
| GB | 2404890 | | 2/2005 |
| JP | 60090605 A | * | 5/1985 |
| JP | 04146018 A | * | 5/1992 |
| JP | 07040116 A | * | 2/1995 |
| JP | 09155811 A | * | 6/1997 |
| JP | 11058117 A | * | 3/1999 |
| JP | 11170106 A | * | 6/1999 |
| JP | 2002370117 A | * | 12/2002 |
| JP | 2005052939 A | * | 3/2005 |

* cited by examiner

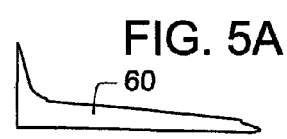
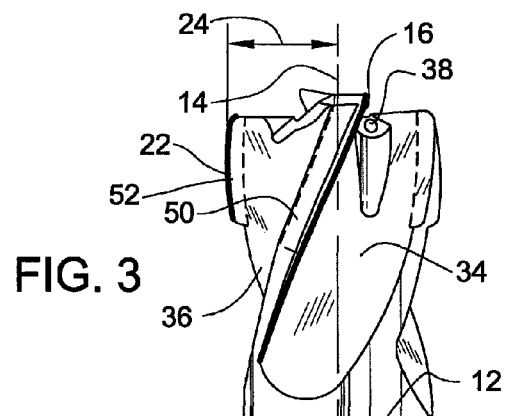
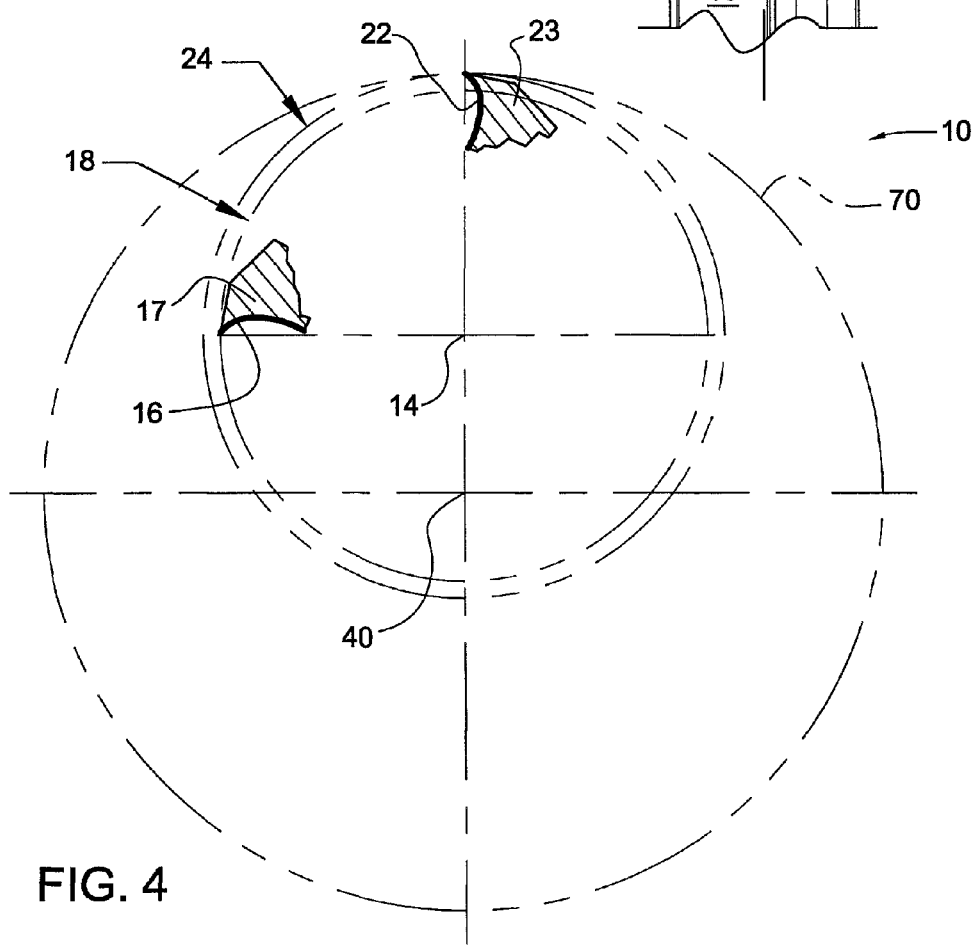

CUTTER FOR DRILLING AND REAMING

TECHNICAL FIELD

Embodiments of the disclosure relate to the field of cutting tools, and, more specifically, to a cutting tool suitable for forming holes in a stack of two or more dissimilar materials.

BACKGROUND

Certain machining applications require drilling and/or reaming a hybrid stack-up of materials. A hybrid stack-up of materials may be defined as layers of discontinuous materials such as a stack-up of a carbon fiber composite, and titanium and/or aluminum, and/or steel. Machining such hybrid stack-ups can be time-consuming and can cause significant tool-wear. An added challenge is to perform the drilling operation burrless, and chip free, to eliminate non-value added tasks such as cleaning and deburring the parts.

For example, certain aircraft require an aircraft wing made from a composite material, such as a graphite composite, be joined to a titanium section of an aircraft body with fasteners, such as without limitations, pins, bolts or rivets, that pass through holes made through the mating sections. The wing to body join task typically requires a three-step conventional drilling process comprising a pilot drill, followed by a step drill, followed by a finish diameter reamer. Each of these three steps can create messy spiraled chips, form elongated holes, and leave lubrication residue. Each step can also create ragged entry and exit burrs in the stack.

Dissimilar materials can also require dissimilar cutting tool characteristics. For example, machining titanium can require very tough tool characteristics while machining carbon fiber composites can require very wear resistant characteristics. Effective machining of dissimilar material can also require using separate tools having dissimilar tool geometry.

With all methods of drilling holes, the life of the cutting tool is severely shortened when drilling through hybrid stack-ups. With the three-step conventional drilling process, not only are the front cutting edges worn away, but also the diameter of the cutter is reduced, which prevents the drill from being resharpened and reused.

One process being explored as a one-step drilling solution for the wing to body join task is orbital hole machining. However, the life of the cutting tool used can be limited with orbital machining.

What is needed is a cutter to produce good quality holes in a hybrid stack-up without the shortcomings of current cutters.

SUMMARY

These and other needs may be provided by a drill bit having a drill bit body with a central axis, and which may include a first cutting edge disposed on the drill bit body at a first radial distance from the central axis as measured within a plane normal to the central axis. The drill bit body may also include a second cutting edge disposed on the drill bit body at a second radial distance from the central axis as measured from within the plane. The first radial distance may be less than the second radial distance. In one embodiment, the first cutting edge may be longer than the second cutting edge.

In some embodiments the drill bit may include a first cutting flute having the first cutting edge, and a second cutting flute having the second cutting edge. The first cutting edge may be adapted to cut a layer of a composite material, and the second cutting edge may be adapted to cut a layer of material selected from the group consisting of titanium, aluminum, and steel.

The drill bit may include a first cutting flute to receive a first insert to form the first cutting edge, and a second cutting flute to receive a second insert to form the second cutting edge. In some embodiments the first insert may be made of material selected for characteristics well suited to drill carbon fiber composite, and the second insert may be made of material selected for characteristics well suited to drill one or both of titanium, aluminum, or steel. For example, the first insert may be made of polycrystalline diamond (PCD) and the second insert may be made of cubic boron nitride (CBN). In other embodiments the first cutting edge itself may be treated with polycrystalline diamond (PCD) and the second cutting edge itself may be treated with cubic boron nitride (CBN).

Embodiments may provide a drill bit that may have a third cutting flute having a cutting edge disposed on the drill bit body at one of the first distance and the second distance as measured from within the plane.

In some embodiments the drill bit may be adapted to be used in an orbital drilling apparatus. In the same or other embodiments the drill bit may include one or more holes disposed through the drill bit body to enable a fluid to pass therethrough to a workpiece. In some embodiments the first cutting edge may form larger chips when machining a workpiece than the second cutting edge does when machining the workpiece.

Embodiments of the disclosure may provide a cutting tool having a shaft with a first end for engaging a tool holding system and a second end for engaging a part. The cutting tool may include a first cutting flute having a first cutting edge disposed on the shaft at a first distance from a shaft centerline, and a second cutting flute having a second cutting edge disposed on the shaft at a second distance from the shaft centerline. The first distance may be less than the second distance. Further, in some embodiments, the first cutting edge may be longer than the second cutting edge.

The cutting tool may have a third cutting flute having a third cutting edge at the first distance from the shaft centerline opposite the first cutting flute. The cutting tool may also have a fourth cutting flute having a fourth cutting edge at the second distance from the shaft centerline opposite the second cutting flute. In one embodiment the first cutting flute may be one of a first one or more oppositely disposed pairs of similarly configured cutting flutes each having a first cutting edge at the first distance from the shaft centerline. The second cutting flute may be one of a second one or more oppositely disposed pairs of similarly configured cutting flutes each having a second cutting edge at the second distance from the shaft centerline.

Embodiments may provide a cutting tool wherein the first cutting flute may be adapted to cut a layer of a composite material, and the second cutting flute may be adapted to cut a layer of a titanium material.

Various embodiments may provide a method of drilling and/or reaming a stack of dissimilar aircraft components. The method may include:
  Providing a stack of aircraft parts;
  Drilling or reaming a hole using a cutting tool. The cutting tool may comprise: A first cutting flute having a first cutting edge disposed on the cutting tool at a first distance from a shaft centerline; and a second cutting flute having a second cutting edge disposed on the cutting tool at a second distance from the shaft centerline, the first distance being less than the second distance, and the first cutting edge being longer than the second cutting edge.

In various embodiments the drilling or reaming a hole may include rotating the cutting tool about the shaft centerline while orbiting the shaft centerline about an orbiting drill center. And in various embodiments the drilling or reaming may include one or both of drilling at least one layer of the stack of aircraft parts and reaming at least one layer of the stack of aircraft parts.

In various embodiments the providing a stack of aircraft parts may include aligning a portion of an aircraft wing including a composite material with a portion of an aircraft body made of a material selected from the group consisting of titanium, steel, and aluminum. In these and other embodiments the method may include one or both of treating the first cutting edge with polycrystalline diamond (PCD), and treating the second cutting edge with cubic boron nitride (CBN). In these and other embodiments the method may also include one or both of providing a first insert as the first cutting edge made from polycrystalline diamond (PCD), and providing a second insert as the second cutting edge made from cubic boron nitride (CBN). The one or both of providing a first insert and providing a second insert may include one selected from the group consisting of brazing, soldering, welding, and adhering one or both of the first insert and the second insert onto the cutting tool.

In various embodiments the drilling and/or reaming may include cutting relatively larger chips from layers in the stack of aircraft parts with the first cutting flute, and cutting relatively smaller chips from the layers in the stack of aircraft parts with the second cutting flute.

In various embodiments the method may further include selecting a relationship between the first distance and the second distance based on the material properties of the stack of aircraft parts such that the first cutting flute and the second cutting flute become dull at substantially the same time.

Various embodiments may provide an apparatus for forming a hole including a drill bit that may be adapted for orbital movement about an orbital center, and that may also be adapted for rotation about a drill bit central axis. A first cutting edge on the drill bit may be disposed a first distance from the central axis as measured in a plane normal to the central axis. A second cutting edge may also be on the drill bit and disposed a second distance from the central axis as measured in the plane. The first distance may be less than the second distance. The first cutting edge may be longer than the second cutting edge.

In various embodiments the first cutting edge may include or may be made from a first material selected for characteristics well suited to drill and/or ream a carbon fiber composite. The second cutting edge may include or may be made from a second material selected for characteristics well suited to drill and/or ream an object comprising one material selected from the group consisting of titanium, aluminum, and steel.

The features, functions, and advantages can be achieved independently in various embodiments of the disclosure or may be combined in yet other embodiments.

BRIEF DESCRIPTION OF THE DRAWINGS

Embodiments of the disclosure will be readily understood by the following detailed description in conjunction with the accompanying drawings. Embodiments of the disclosure are illustrated by way of example and not by way of limitation in the figures of the accompanying drawings.

FIG. 3 illustrates a partial profile view of a cutter for drilling and reaming in accordance with various embodiments of the disclosure;

FIG. 4 is a schematic plan view with partial cross-sectional representations of two edges illustrating various embodiments according to the disclosure; and FIGS. 5A and 5B illustrate side views of different chips and their relative sizes that may be formed in a machining operation in accordance with various embodiments of the disclosure.

DETAILED DESCRIPTION

Figure 1A:
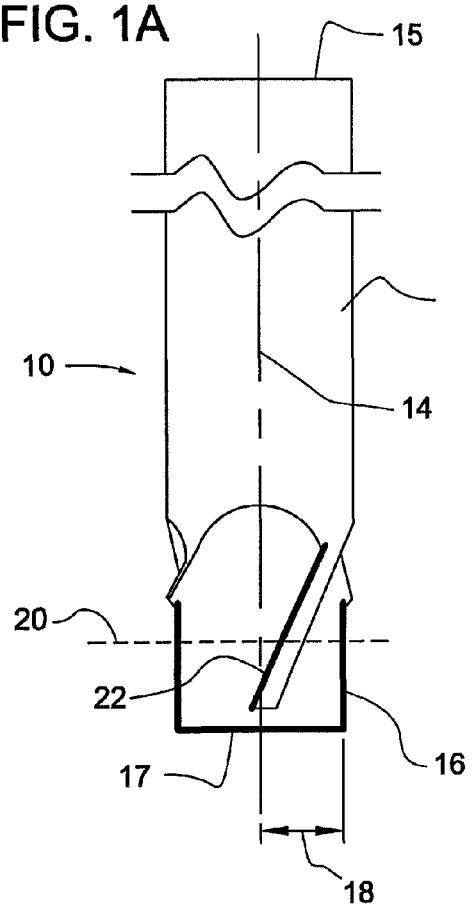
FIGS. 1A and 1B illustrate respective partial front and partial side profile views of a cutter for drilling and reaming in accordance with various embodiments of the disclosure.

In the following detailed description, reference is made to the accompanying drawings which form a part hereof, and in which is shown by way of illustration embodiments of the disclosure. It is to be understood that other embodiments may be utilized and structural or logical changes may be made without departing from the scope of the disclosure. Therefore, the following detailed description is not to be taken in a limiting sense, and the scope of embodiments in accordance with the disclosure is defined by the appended claims and their equivalents.

Various operations may be described as multiple discrete operations in turn, in a manner that may be helpful in understanding various embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of the embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" means A or B. For the purposes of the description, a phrase in the form "A and/or B" means "(A), (B), or (A and B)." For the purposes of the description, a phrase in the form "at least one of A, B, and C" means "(A), (B), (C), (A and B), (A and C), (B and C), or (A, B and C)." For the purposes of the description, a phrase in the form "(A)B" means "(B) or (AB)," that is, A is an optional element.

The description may use the phrases, "various embodiments," "in an embodiment," or "in embodiments," which may each refer to one or more of the same or different embodiments. Furthermore, the terms "comprising," "including," "having," and the like, as used with respect to embodiments as described in the present disclosure, are synonymous.

In various embodiments, methods, apparatuses, and systems for machining layers of material are provided. In exemplary embodiments, a computing system may be endowed with one or more components of the disclosed apparatuses and/or systems and may be employed to perform one or more methods as disclosed herein.

Various embodiments as described in the present disclosure may provide a cutter which may be used with an orbital drilling process when applied to the materials used in certain stack-ups. Embodiments may enable good quality holes in thick hybrid stack-ups and may prolong the life of the cutter. The terms drill bit and cutter may be considered to be interchangeable terms in certain instances throughout the specification and the appended claims, in that when either term is used it may be considered to refer to a device used for drilling or a device used for milling or both.

Various embodiments may provide separate teeth having two different diameters which may divide the load placed on each tooth. Some of the work may be done by the leading tooth, or teeth, and some of the work may be done by the following, or trailing, tooth, or teeth.

Various embodiments may provide a leading tooth, or teeth, that may be prone to lose more diameter than the following tooth, or teeth. With these and other embodiments the trailing tooth, or teeth, may maintain a very precise diameter as the leading tooth, or teeth, may receive the majority of wear.

Figure 1B:
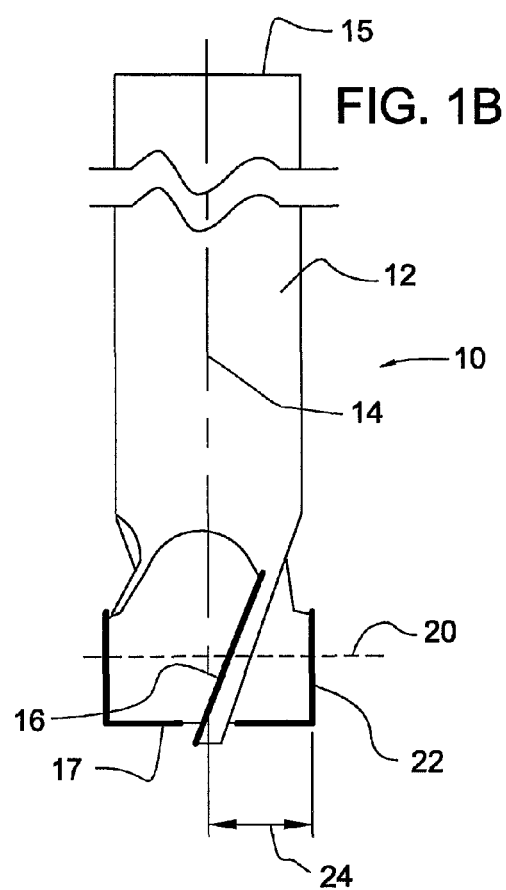
Figure 1C:
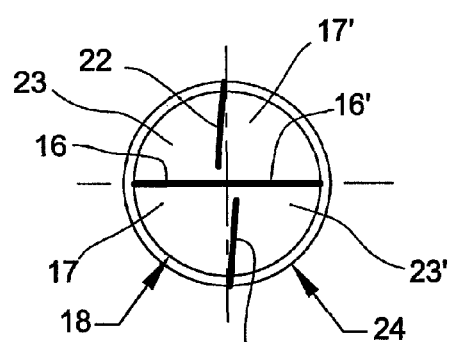
FIG. 1C illustrates a bottom view of the cutter for drilling and reaming, illustrated in FIGS. 1A and 1B, in accordance with various embodiments of the disclosure.

FIG. 1A is a front profile view, FIG. 1B is a side profile view, and FIG. 1C is a bottom view illustrating various embodiments according to the disclosure. A cutter for use with, for example, with a milling arrangement, or a drill bit 10 may include a drill bit body 12 having a central axis 14. The drill bit 10 may include a first end 15 for engaging a tool holding system (not shown) and a second end 17 for engaging a part, or a workpiece (not shown). A first cutting edge 16 may be disposed on the drill bit body at a first radial distance 18 from the central axis 14 as measured from within a plane 20 normal to the central axis 14. A second cutting edge 22 may be disposed on the drill bit body 12 at a second radial distance 24 from the central axis 14 as measured from within the plane 20, the first radial distance 18 may be less than the second radial distance 24. The plane 20 may be substantially perpendicular to the central axis 14.

Figure 2A:
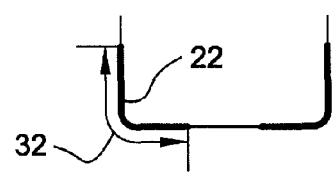
FIG. 2A and FIG. 2B are schematic views illustrating relative cutting lengths of the cutting edges illustrated in FIGS. 1A and 1B.
Figure 2B:
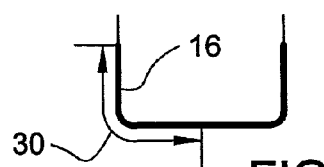

FIG. 2A and FIG. 2B are schematic views illustrating the relative cutting lengths of each respective cutting edge 22 and 16 from FIGS. 1A and 1B. In various embodiments the first cutting edge 16 may be longer, as illustrated with dimension 30, in FIG. 2B than the second cutting edge 22, as illustrated with dimension 32 in FIG. 2A.

In various embodiments each cutting edge 16 and 22 may be treated or impregnated, or otherwise altered to alter its cutting characteristics. For example, without limitation, the first cutting edge 16 may be treated with polycrystalline diamond (PCD) and the second cutting edge may be treated with cubic boron nitride (CBN).

Various embodiments may include a cutting flute having a third cutting edge disposed on the drill bit body at one of the radial first distance and the radial second distance as measured from within the same plane. Various embodiments may include any number of cutting flutes greater than two. Each may have a cutting edge. Various embodiments may include an odd number of cutting flutes. For example, one embodiment may include two cutting flutes cutting at a relatively smaller diameter, and one cutting flute cutting the finished diameter. Various other embodiments may include an even number of cutting flutes. Various embodiments may provide greater stability and reduce vibration by arranging cutting flutes in symmetrical pairs.

For example, as illustrated in FIG. 1C, one embodiment may include one or more oppositely disposed first pairs of similarly configured cutting flutes 17 and 17' each having a first cutting edge 16 and 16' at the first radial distance 18 from the shaft central axis 14, and one or more oppositely disposed second pairs of similarly configured cutting flutes 23 and 23' each having a second cutting edge 22 at the second radial distance 24 from the central axis 14.

FIG. 3 is a side view illustrating various embodiments wherein a drill bit body 12 may include a first cutting flute 34 having a first cutting edge 16, and a second cutting flute 36 having a second cutting edge 22. The first cutting edge 16 may be adapted to cut a layer of a first material, for example, a layer of a composite material, and the second cutting edge 22 may be adapted to cut a layer of a second material. The second layer may be one of, for example, titanium, aluminum, or steel.

Various embodiments may include a cutter body, or a drill bit body 12 having one or more holes 38 disposed through the drill bit body 12 to enable a fluid to pass therethrough to a workpiece (not shown). The fluid may exit at the workpiece surface and serve to blow, or otherwise move, debris such as chips cut from the workpiece away from the work area. The fluid may be, for example, air. Other fluids may be used. In one embodiment a lubricating fluid may be passed through the hole 38.

Various embodiments may include a drill bit 10 wherein the first cutting flute 34 may be adapted to receive a first insert 50 to form the first cutting edge 16 and wherein the second cutting flute 36 may be adapted to receive a second insert 52 to form the second cutting edge 22. The one or more inserts may be attached to the drill bit body 12 using various methods, including but not limited to brazing, soldering, or attaching with an adhesive.

The first insert 50 may be made of a material selected for characteristics well suited to drill, a first material, for example, carbon fiber composite. The second insert 52 may be made of material selected for characteristics well suited to drill a second material, for example, titanium, aluminum, or steel. In various embodiments the first insert may be made of polycrystalline diamond (PCD) and the second insert may be made of cubic boron nitride (CBN).

Various embodiments may be used in an orbital drilling arrangement, or in a milling arrangement, or other arrangement that may be adapted for orbital movement about an orbital center, or circular motion approximated by rectilinear movement. For example, various embodiments may be used with Computer Numerical Control (CNC) or Numerical Control (NC) equipment having circular interpolating capabilities.

Various embodiments may be used in an orbital drilling apparatus. FIG. 4 is a schematic plan view illustrating various embodiments according to the disclosure. A drill bit 10 may be adapted for orbital movement about an orbital drill center 40, and may be adapted for rotation about a drill bit central axis 14. The first cutting edge 16 may be considered a "leading" cutting edge and may cut the majority of the material being machined with each pass, and may be disposed at a first radial distance 18 from the central axis 14. While the second cutting edge 22 may be considered a "trailing" cutting edge and may be disposed at a second radial distance 24 from the central axis 14, and may cut only the outermost portion of the material being machined with each pass. In this way the diameter of the drill bit may experience less wear, which may enable more holes, or more of a single hole, to be drilled with consistent diameter.

In various embodiments, a difference between the first radial distance 18 and the second radial distance 24 may be selected based on the material properties of the stack of aircraft parts and/or the material properties of the respective cutting edges so that the first cutting edge 16 and the second cutting edge 22 become dull at substantially the same time. The useful life of the tool may thus be maximized.

FIGS. 5A and 5B illustrate side views of different chips and their relative sizes that may be formed in a machining operation in accordance with various embodiments. In various embodiments the first cutting edge 16 as illustrated in FIG. 4 may cut a relatively large chip 60, as illustrated in FIG. 5A, while the second cutting edge 22 may cut a relatively small chip 62, as illustrated in FIG. 5B.

Returning again to FIG. 4, various embodiments may provide a method of drilling and/or reaming a stack of dissimilar aircraft components. The method may include providing a stack of aircraft parts and drilling or reaming a hole 70 using a cutting tool. The cutting tool may include a first cutting flute 17 having a first cutting edge 16 disposed on the cutting tool at a first radial distance 18 from a central axis 14, and a second cutting flute 23 having a second cutting edge 22 disposed on the drill bit 10 at a second radial distance 24 from the central axis 14, the first radial distance 18 may be less than the second radial distance 24, and the first cutting edge 16 may be longer than the second cutting edge 22.

Various embodiment may include a method wherein drilling or reaming a hole 70 may include rotating the cutting tool 10 about the central axis 14 while orbiting the shaft centerline 14 about an orbiting drill center 40. The drilling or reaming may include one or both of drilling at least one layer of the stack of aircraft parts and reaming at least one layer of the stack of aircraft parts.

In various embodiments, providing a stack of aircraft parts may include aligning a portion of an aircraft wing which may be made from, or may include, a composite material, with a portion of an aircraft body made of a material selected from the group consisting of titanium, steel, and aluminum.

Various embodiments may include a method that includes one or both of treating the first cutting edge 16 with polycrystalline diamond (PCD), and treating the second cutting edge 22 with cubic boron nitride (CBN). In other embodiments a method may include one or both of providing a first insert 50 as the first cutting edge 16 made from polycrystalline diamond (PCD), and providing a second insert 52 as the second cutting edge 22 made from cubic boron nitride (CBN). Providing the first 50 and second inserts 52 may include brazing, or soldering, welding or adhering, one or both of the first insert and the second insert onto the drill bit.

Various embodiments may include cutting relatively larger chips 60, FIG. 5A, from layers in the stack of aircraft parts with the first cutting edge 16, and cutting relatively smaller chips 62, FIG. 5B, from the layers in the stack of aircraft parts with the second cutting edge 22.

Various embodiments may include selecting a relationship between the first distance and the second distance based on the material properties of the stack of aircraft parts such that first cutting flute and the second cutting flute become dull at substantially the same time.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

The invention claimed is:

1. A drill bit comprising:
a drill bit body having a central axis;
a first cutting flute having a first cutting edge disposed on the drill bit body at a first radial distance from the central axis as measured within a first plane normal to the central axis;
a second cutting flute having a second cutting edge disposed on the drill bit body at a second radial distance from the central axis as measured from within a second plane normal to the central axis, the first radial distance being less than the second radial distance;
the first and second cutting edges each having a length extending along a combined direction of substantially perpendicular to the central axis and helically along the drill bit body;
the length of the first cutting edge being longer than the length of the second cutting edge such that during orbital drilling, the first cutting edge removes a majority of material being machined; and
the first cutting edge is made of polycrystalline diamond, and the second cutting edge is made of cubic boron nitride.

2. The drill bit of claim 1 wherein the first cutting edge is configured to form larger chips when machining a workpiece than the chips formed by the second cutting edge when machining the workpiece.

3. The drill bit of claim 1 further comprising a third cutting flute having a cutting edge disposed on the drill bit body at one of the first distance and the second distance as measured from within the respective first and second plane.

4. The drill bit of claim 1 wherein the drill bit body is adapted to be used in an orbital drilling apparatus.

5. The drill bit of claim 1 further comprising one or more holes disposed through the drill bit body to enable a fluid to pass therethrough to a workpiece.

6. A drill bit comprising:
a drill bit body having a central axis;
a first cutting flute having a first cutting edge disposed on the drill bit body at a first radial distance from the central axis as measured within a first plane normal to the central axis;
a second cutting flute having a second cutting edge disposed on the drill bit body at a second radial distance from the central axis as measured from within a second plane normal to the central axis, the first radial distance being less than the second radial distance;
the first cutting flute including a first insert forming the first cutting edge, and the second cutting flute including a second insert forming the second cutting edge;
the first and second cutting edges each having a length extending along a combined direction of substantially perpendicular to the central axis and helically along the drill bit body;
the length of the first cutting edge being longer than the length of the second cutting edge such that during orbital drilling, the first cutting edge removes a majority of material being machined; and
the first insert is made of polycrystalline diamond (PCD) and the second insert is made of cubic boron nitride (CBN).

7. A cutting tool comprising:
a shaft with a first end for engaging a tool holding system and a second end for engaging a part;
a first cutting flute having a first cutting edge disposed on the shaft at a first radial distance from a shaft centerline;
a second cutting flute having a second cutting edge disposed on the shaft at a second radial distance from the shaft centerline, the first radial distance being less than the second radial distance;
the first and second cutting edges each having a length extending along a combined direction of substantially perpendicular to the shaft centerline and helically along the shaft;
the length of the first cutting edge being longer than the length of the second cutting edge such that during orbital drilling, the first cutting edge removes a majority of material being machined; and
the first cutting edge is treated with polycrystalline diamond (PCD) and the second cutting edge is treated with cubic boron nitride (CBN).

8. The cutting tool of claim 7 further comprising a third cutting flute having a third cutting edge at the first distance from the shaft centerline opposite the first cutting flute, and a fourth cutting flute having a fourth cutting edge at the second distance from the shaft centerline opposite the second cutting flute.

9. The cutting tool of claim 7 wherein the first cutting flute is one of a first one or more oppositely disposed pairs of similarly configured cutting flutes each having a first cutting edge at the first distance from the shaft centerline, and the second cutting flute is one of a second one or more oppositely disposed pairs of similarly configured cutting flutes each having a second cutting edge at the second distance from the shaft centerline.

10. The cutting tool of claim 7 wherein the cutting tool is adapted to be used in an orbital drilling apparatus.

11. The cutting tool of claim 7 further comprising one or more holes disposed through the shaft to enable a fluid to pass therethrough to remove debris from the part.

12. The cutting tool of claim 7 further wherein first cutting flute is adapted to receive a first insert to form the first cutting edge, and the second cutting flute is adapted to receive a second insert to form the second cutting edge.

13. A method of drilling and/or reaming a hole in a part formed of at least one material, comprising the steps of:
providing a cutting tool having a central axis and first and second cutting flutes including first and second cutting edges, the first and second cutting edges each having a length extending along a combined direction of substantially perpendicular to the central axis and helically along the cutting tool, the first cutting edge being longer than the second cutting edge;
cutting, during orbital drilling, a majority of the material being removed with each pass of the first cutting edge at a first radius;
cutting an outermost portion of material being removed with each pass of the second cutting edge at a second radius being larger than the first radius;
performing at least one of the following:
providing a first insert as the first cutting edge formed of polycrystalline diamond (PCD); and
providing a second insert as the second cutting edge formed of cubic boron nitride (CBN).

14. The method of claim 13 further comprising the step of:
rotating the cutting tool about a shaft centerline while orbiting the shaft centerline about an orbiting drill center.

15. The method of claim 13 further comprising at least one of the following steps:
drilling at least one layer of a stack of parts; and
reaming at least one layer of the stack-of-parts.

16. The method of claim 13 further comprising the step of:
aligning a portion of an aircraft wing including a composite material with a portion of an aircraft body formed of a material selected from the group consisting of titanium, steel, and aluminum.

17. The method of claim 13 wherein at least one of the steps of providing a first insert and providing a second insert includes at least one of brazing, soldering, welding, and adhering a respective one of the first insert and the second insert onto the cutting tool.

18. The method of claim 13 further comprising at least one of the following steps:
cutting relatively larger chips from the part using the first cutting flute; and
cutting relatively smaller chips from the part using the second cutting flute.

19. An apparatus for forming a hole comprising:
a drill bit adapted for orbital movement about an orbital center, and adapted for rotation about a drill bit central axis;
a first cutting flute having a first cutting edge on the drill bit disposed at a first radial distance from the central axis as measured in a plane normal to the central axis;
a second cutting flute having a second cutting edge on the drill bit disposed at a second radial distance from the central axis as measured in the plane, the first radial distance being less than the second radial distance;
the first and second cutting edges each having a length extending along a combined direction of substantially perpendicular to the drill bit central axis and helically along the drill bit;
the length of the first cutting edge being longer than the length of the second cutting edge such that during orbital drilling, the first cutting edge removes a majority of material being machined; and
the first cutting edge includes or is made from polycrystalline diamond and the second cutting edge includes or is made from cubic boron nitride.

* * * * *